United States Patent [19]

Hasegawa

[11] 4,121,553
[45] Oct. 24, 1978

[54] ELECTRIC IGNITION ADVANCE SYSTEM

[75] Inventor: Takashi Hasegawa, Kariya, Japan

[73] Assignee: Nippondenso Co., Ltd., Kariya, Japan

[21] Appl. No.: 766,617

[22] Filed: Feb. 7, 1977

[30] Foreign Application Priority Data

Mar. 12, 1976 [JP] Japan .................... 51-27390

[51] Int. Cl.² .................... F02P 5/08; F02B 3/10
[52] U.S. Cl. .................... 123/117 D; 123/32 EC; 123/32 EB
[58] Field of Search ....... 123/117 D, 117 R, 146.5 A, 123/32 EC, 32 EB

[56] References Cited

U.S. PATENT DOCUMENTS

| | | | |
|---|---|---|---|
| 3,816,717 | 6/1974 | Yoshida et al. | 123/117 D |
| 3,898,962 | 8/1975 | Honig et al. | 123/117 D |
| 3,903,857 | 9/1975 | Honig et al. | 123/117 D |
| 3,908,616 | 9/1975 | Sasayama | 123/32 EC |
| 3,927,304 | 12/1975 | Wentworth et al. | 123/32 EC |
| 3,927,648 | 12/1975 | Kawai et al. | 123/117 D |
| 4,051,822 | 10/1977 | Yoshida | 123/117 D |

*Primary Examiner*—Charles J. Myhre
*Assistant Examiner*—P. S. Lall
*Attorney, Agent, or Firm*—Cushman, Darby & Cushman

[57] ABSTRACT

An electric ignition advance system for internal combustion engines wherein an ignition timing to be advanced in accordance with a scheduled pattern is determined digitally. Advance pattern voltage generators generate voltage signals depending on engine operation parameters such as engine rotational speed or engine intake vacuum and hence the voltage signals represent scheduled advance pattern voltages. The voltage signal, i.e., the advance pattern voltages are combined and the resultant signal is converted into a frequency signal. The frequency signal is counted by a digital ignition timing determination circuit with respect to a reference ignition signal supplied from, e.g. a distributor. When the digital ignition timing determination circuit counts a predetermined number of the frequency signals, it provides an ignition signal.

3 Claims, 5 Drawing Figures

ELECTRIC IGNITION ADVANCE SYSTEM

BACKGROUND OF THE INVENTION

The present invention relates to an electric ignition advance system for internal combustion engines.

Two types of mechanical ignition advance mechanisms, centrifugal and vacuum advance mechanisms, have been known in the art. The centrifugal advance mechanism controls the ignition timing of an engine by varying by centrifugal force the positional relation between the engine camshaft and the distributor cam lobes and the vacuum advance mechanism controls the ignition timing by moving the advancer rod in accordance with the degree of vacuum in the intake manifold and thereby rotating the breaker plate of the distributor.

However, since all of these conventional centrifugal and vacuum advance mechanisms are of the mechanical type, these mechanisms are much unsatisfactory in accuracy and it is difficult for them to meet the required ignition advance characteristics. Although electric ignition advance systems of various types have also been proposed, their application in practical use is still unsatisfactory due to such deficiencies as unsatisfactory accuracy, complicate circuitry, etc.

SUMMARY OF THE INVENTION

It is an object of this invention to provide an improved electric ignition advance system which is simple in construction and accurate in operation.

This invention thus comprises an electric ignition advance system in which a signal produced by the closing and opening of the distributor contact points, an ignition timing signal by the pickup coil of a full transistor ignition system or the like is utilized as a timing signal for producing an ignition advance pulse proportional to a DC input voltage (advance angle setting voltage). In place of the conventional mechanical ignition advance mechanisms, e.g., vacuum advance mechanism, a vacuum signal may be produced by a vacuum sensor or the like so that a required advance pattern voltage is produced from the vacuum signal and utilized as an input signal, thus providing vacuum advance means. In the like manner, the function of the conventional centrifugal advance mechanism can be provided by producing an advance pattern voltage in accordance with the engine rotational speed and utilizing it as an input signal, and also by detecting the vehicle speed, oil temperature, water temperature, etc., and producing advance pattern voltages and by combining these parameters, it is possible to meet the advance requirements in relation to these engine operating parameters.

More specifically, in accordance with the system of this invention, an advance pattern voltage generator arrangement produces a control voltage corresponding to a predetermined ignition timing value so that the control voltage is directly converted by a V-F converter to a frequency corresponding thereto and a digital ignition timing computing circuit digitally computes an ignition timing in accordance with the frequency, and there is thus a remarkable effect in that not only it is possible to obtain a desired more accurate ignition advance characteristic corresponding to the output voltage of the advance pattern voltage generator arrangement but also the circuit construction is simplified since it is only necessary to directly convert the control voltage to the corresponding frequency by the V-F converter, and moreover the existing ignition signal generating means can be used without any modification for producing the required timing signal.

DESCRIPTION OF THE PREFERRED EMBODIMENT

Figure 1:
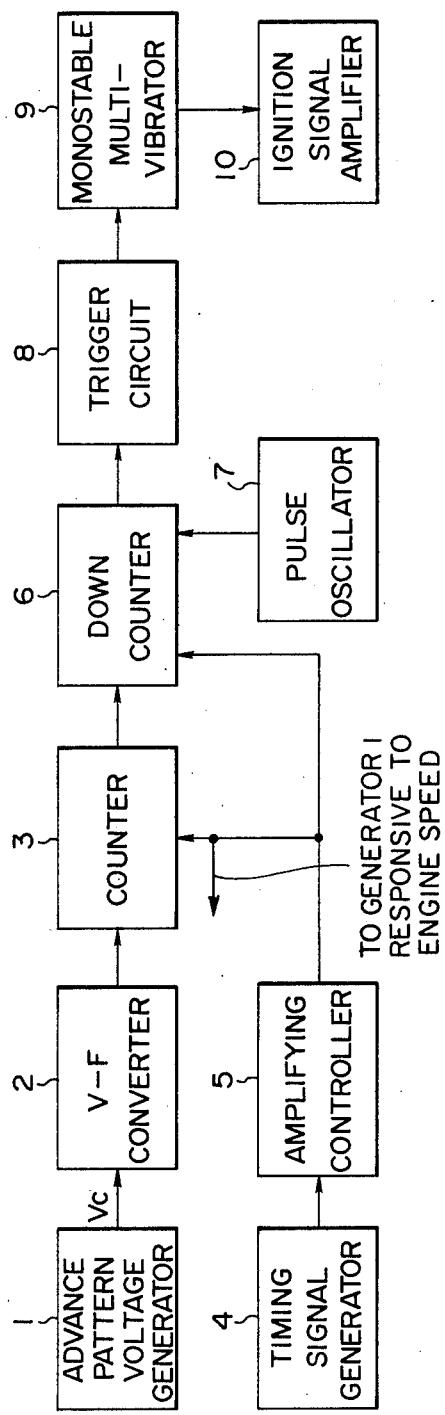
FIG. 1 is a block diagram showing an embodiment of a system according to the invention.

The present invention will now be described in detail with reference to the illustrated embodiment. Referring first to the block diagram shown in FIG. 1, numeral 1 designates a plurality of advance pattern voltage generators for producing an advance angle setting control voltage $V_c$. Numeral 2 designates a voltage-to-frequency converter (hereinafter simply referred to as a V-F converter) for converting the control voltage from the advance pattern voltage generators 1 to a frequency. Numeral 3 designates a counter for counting the pulses from the V-F converter 2, 4 a timing signal generator comprising for example the distributor contact points of the engine or pickup coil, 5 an amplifying controller for reshaping and amplifying a timing signal. Numeral 6 designates a down-counter for reading the contents of counter 3 and starting to count down in response to the application of the timing signal, the counters 3 and 6 constituting a reversible counter. Numeral 7 designates a pulse oscillator for producing clock pulses having a fixed frequency and used as clock pulses for causing the down-counter 6 to count down. Numeral 8 designates a trigger circuit for producing a trigger pulse when the contents of the down-counter 6 are decreased to zero. Numeral 9 designates a monostable multivibrator, 10 an ignition signal amplifier for amplifying the rectangular wave signal from the monostable multivibrator 9 and energizing the ignition coil.

Figure 4:
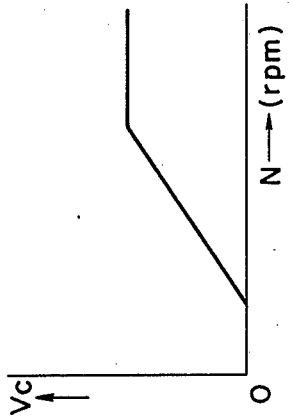
FIGS. 3 and 4 are engine speed versus output voltage characteristic diagrams which are useful for explaining the operation of the advance pattern voltage generator used in the system shown in FIG. 2.
Figure 3:
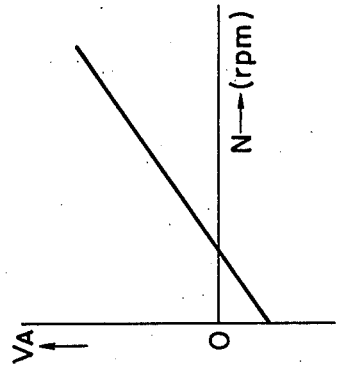
Figure 2:
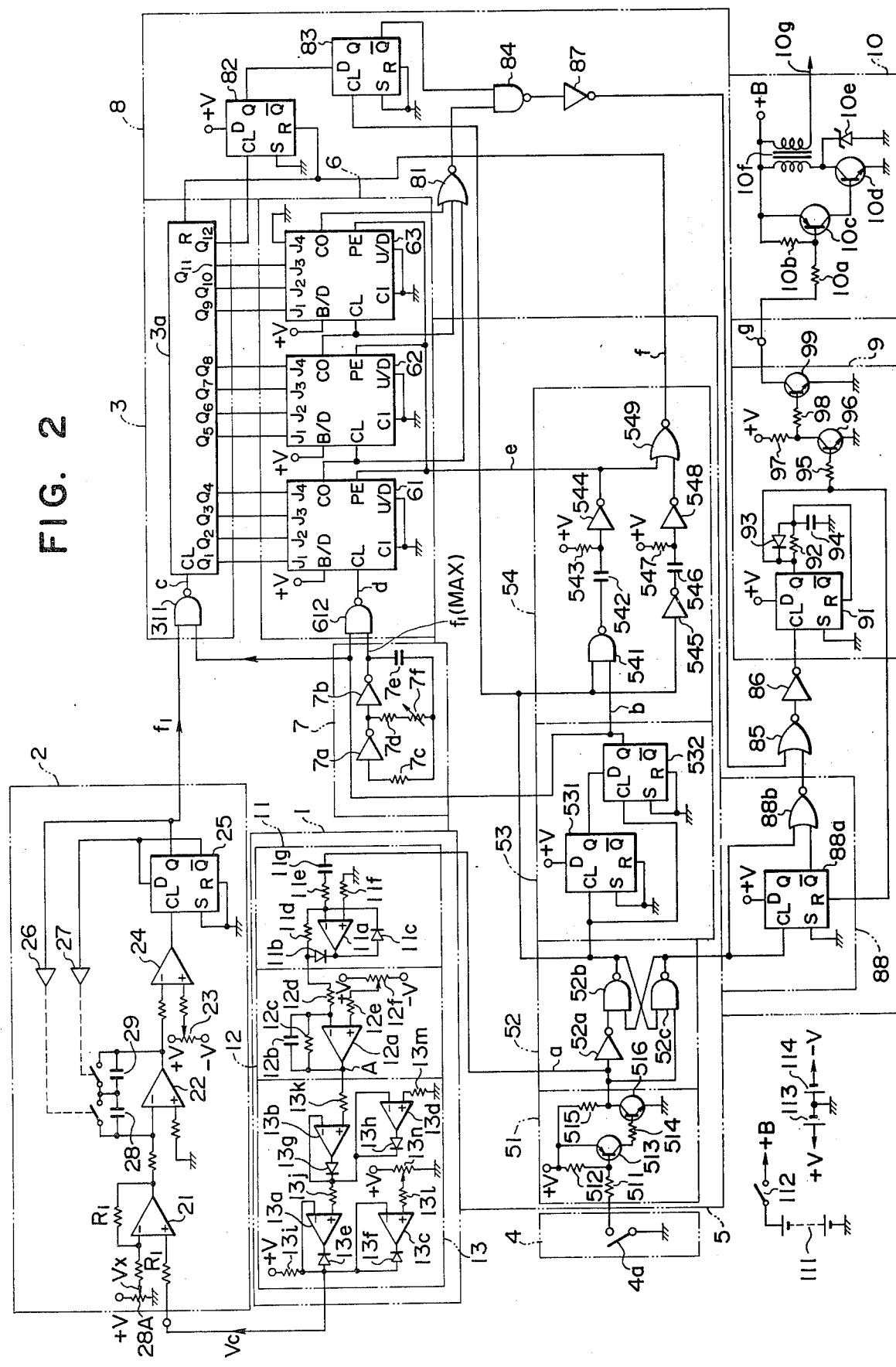
FIG. 2 is a circuit diagram showing an exemplary detailed circuitry of the system according to the invention.

Next, the individual circuits shown in the block diagram of FIG. 1 will be described in detail with reference to FIG. 2. Referring first to the advance pattern voltage generators 1, only a single pattern voltage generator responsive to engine speed is described in detail. However, as pointed out hereinafter, in actual operation a plurality of pattern generators are employed which are responsive to various engine parameters. In the illustrated arrangement numeral 11 designates a differentiator and half-wave rectifier of a known type adapted to receive an engine speed signal and comprising an operational amplifier 11a, diodes 11b and 11c, resistors 11d, 11e and 11f and a capacitor 11g for differentiating and half-wave rectifying the input rectangular signal. Numeral 12 designates an integrator of a known type comprising an operational amplifier 12a, a capacitor 12b, resistors 12c, 12d and 12e and an adjusting resistor 12f for integrating the rectified waveform to produce at a point A a voltage $V_A$ which is proportional to the engine rotational speed N as shown in FIG. 3. The voltage $V_A$ increases from the minus voltage as the speed N increases. Numeral 13 designates an upper limit selection circuit and lower limit selection circuit comprising operational amplifiers 13a, 13b, 13c and 13d, diodes 13e, 13f, 13g and 13h, resistors 13i, 13j, 13k, 13l and 13m and an adjusting resistor 13n for producing the control voltage $V_C$ whose peak and minimum voltage values are preset to the desired values as shown in FIG. 4.

The V-F converter 2 is of a known type designed to produce clock pulses of a frequency $f_1$ proportional to the input voltage $V_C$, in which numerals 21, 22 and 24 designate operational amplifiers, with the operational amplifier 21 being used as an inverting amplifier, the operational amplifier 22 as an integrator and the operational amplifier 24 as a comparator. Numeral 25 designates a data flip-flop having its set terminal S and reset terminal R grounded and its data terminal D and inverted output terminal $\overline{Q}$ connected to each other and it is adapted to serve as a ½ frequency divider. Numerals 26 and 27 designate analog switches each comprising the RCA CD4066A bilateral switch and respectively connected to the non-inverted and inverted output terminals Q and $\overline{Q}$ of the data flip-flop 25 so as to be alternately turned on and off repeatedly to establish a short-circuit across capacitors 28 and 29, respectively. Numeral 28a designates an adjustable resistor, 23 an adjustable resistor for determining the comparison voltage of the comparator, and the adjustable resistor 23 and the capacitors 28 and 29 determine the relation between the input voltage $V_C$ and the output frequency $f_1$.

The timing signal generator 4 comprises contact points 4a of the known distributor driven by the engine, and the contact points 4a repeat the on-and-off cycles of operation four times per revolution of the distributor shaft (in the case of a four-cylinder engine), with the on-off duty ratio being dependent on the cam closing angle.

In the amplifying controller 5, numeral 51 designates an amplifier, 511, 512, 514 and 515 resistors, 513 a PNP transistor, 516 an NPN transistor. Numeral 52 designates a waveform shaping circuit comprising an inverter 52a and NAND gates 52b and 52c. Numeral 53 designates an erroneous operation preventive circuit for preventing the occurrence of sparks upon connection of the power source by controlling NAND gates 311, 612 and 541 in such a manner that no sparks are produced unless the starter is operated thus causing the contact points 4a to open and close, and numerals 531 and 532 designate data flip-flops whereby each time two input pulses are applied, a noninverted output terminal Q of the data flip-flop 532 goes to a "high" level and the NAND gates 311, 612 and 541 are opened. Numeral 54 designates a timer circuit for controlling the timing of such operations as setting and resetting of the counters 3 and 6, whereby at the instant that the NAND gate 541 is opened and the contact points 4a are opened, the output of an inverter 544 goes to the "high" level and a trigger pulse is produced whose pulse width is determined by a resistor 543 and a capacitor 542. An inverter 545, a capacitor 546, a resistor 547, a buffer 548 and a NOR gate 549 similarly produce a trigger pulse. The counter 3 comprises an up-counter 3a and the NAND gate 311, whereby when the NAND gate 311 is opened, the up-counter 3a starts to count up input pulses applied from the V-F converter 2 and it continues the counting operation until the application of a reset signal to its reset terminal R. In this embodiment, an output frequency $f_1$ of the V-F converter 2 is given as $f_1 = K(V_X - 2V_C)$, where $K$ is a value determined by the capacitors 28 and 29 and the resistor 23, and $V_X$ is the output voltage of the adjustable resistor 28a. The duration of time that the up-counter 3a counts is determined by the period of the closing and opening cycles of operation of the contacts points 4a or the engine rotational speed. Assuming now that N represents the rotational speed of the engine in rpm and $C_P$ represents the number of pulses counted by the counter 3 during one closing and opening cycle of the contact points 4a, then the following relation is obtained.

$$C_P = f_1 \cdot \frac{60}{2N} = \frac{30K(V_X - 2V_C)}{N}$$

The pulse oscillator 7 comprises inverters 7a and 7b, resistors 7c and 7d, a capacitor 7e and an adjstable resistor 7f and its oscillation frequency is preset to a maximum frequency $f_1(MAX) = K \cdot V_X$ of the V-F converter 2. The down-counter 6 comprises a NAND gate 612 and cascade connected up-down counters 61, 62 and 63 each thereof being adapted to serve as a binary down-counter by always holding its V/D terminal at a "low" level. The up-down counters 61, 62 and 63 also have their Jam terminals $J_1$ to $J_4$ connected respectively to terminals $Q_1$ to $Q_{11}$ of the binary up-counter 3a and only the Jam terminal $J_4$ of the final stage up-down counter 63 is grounded, whereby the up-down counters 61, 62 and 63 read in the contents on the terminals $Q_1$ to $Q_{-1}$ upon application of a trigger pulse to their PE terminals. When the NAND gate 612 is opened, the pulse oscillator 7 applies its clock pulses of the frequency $f_1$ (MAX) to the first stage up-down counter 61 at its CL terminal and the up-down counter 61 starts to count down. Also, the first stage up-down counter 61 has its carry output terminal CO connected to a CL terminal of the intermediate up-down counter 62 whose carry output terminal CO is in turn connected to a CL terminal of the final stage up-down counter 63.

The time interval between the instant at which an initial value is applied to the down-counter 6 and the instant at which the initial value is reduced to zero is dependent on the initial value and the oscillation frequency $f_1$ (MAX) of the pulse oscillator 7. Assuming that this time interval is represented as $\tau$, then it is given as follows:

$$\tau = \frac{C_P}{f_1(MAX)} = \frac{30(V_X - 2V_C)}{N \cdot V_X}$$

Also assuming that $a$ represents the value of $\tau$ in terms of an angle, then it is given as follows:

$$a = \frac{N \cdot 180 \cdot 30(V_X - 2V_C)}{60 \cdot N \cdot V_X} = 90 \left( \frac{V_X - 2V_C}{V_X} \right)$$

Also assuming that represents the angle of ignition advance, then it is given as follows:

$$\beta = 90 - 90 \left( \frac{V_X - 2V_C}{V_X} \right) = \frac{V_C}{V_X} \cdot 180$$

Since $V_X$ is fixed, the advance angle $\beta$ is proportional to $V_C$.

In the trigger circuit 8, numeral 81 designates a NOR gate for producing a trigger pulse when the carry output terminal CO of the up-down counters 61, 62 and 63 go to the "low" level, 82 and 83 data flip-flops, 84 a NAND gate, 87 an inverter and these elements are provided so that the advance angle is reduced to 0° when the counter 3 overflows at low engine speeds. The data flip-flop 82 has its clock terminal CL connected to the terminal $Q_{12}$ of the up-counter 3a, whereby when the up-counter 3a overflows so that the terminal $Q_{12}$ goes to the "high" level during the counting operation, a terminal Q of the data flip-flop 82 goes to the "high" level and this "high" level is maintained until the up-counter 3a is reset. The terminal Q of the data flip-flop 82 is connected to the data terminal of the data flip-flop 83, so that each time a pulse is applied, the data flip-flop 83 detects that the up-counter 3 has overflown during the counting operation. When the up-counter 3 overflows, a terminal $\overline{Q}$ of the data flip-flop 83 goes to the "low" level and the NAND gate 84 is closed. Consequently, the signal detected by the NOR gate 81 is not passed through the NAND gate 84. Numeral 88 designates a compensation circuit which is provided in consideration of the possibility of the NOR gate 81 failing to produce a trigger pulse due to the fact that the distributor contact points 4a cannot be closed and opened by the cam lobes exactly at 90° intervals thus giving rise to some variations, and numeral 88a designates a data flip-flop whose terminal Q goes to the "high" level in response to the closing of the contact points 4a and which is reset by the output pulse of a data flip-flop 91 of the monostable multivibrator 9 thus causing the terminal Q to go to the "low" level. Numeral 88b designates a NOR gate so designed that when the data flip-flop 91 of the monostable multivibrator 9 produces no output pulse during the time interval between the instant at which the contact points 4a are closed causing a terminal $\overline{Q}$ of the data flip-flop 88a to go to the "low" level and the instant at which the contact points 4a are opened again, the output terminal of the NOR gate 88b goes to the "high" level in response to the opening of the contact points 4a. Numerals 85 and 86 respectively designate a NOR gate and an inverter for passing the advance pulse from the NOR gate 81, the zero advance angle position pulse from the compensation circuit 88 when the counter 3 overflows, and similarly the pulse from the compensation circuit 88 when the NOR gate 81 fails to produce an output pulse due to some variations in the opening and closing of the contact points 4a by the cam lobes.

In the monostable multivibrator 9, numeral 91 designates the data flip-flop, 92, 95, 97 and 98 resistors, 93 a diode, 94 a capacitor, 96 and 99 transistors, and its time constant is determined by the resistor 92 and the capacitor 94. Numeral 10 designates an exemplary form of the ignition signal amplifier comprising a transistor ignition circuit, in which numerals 10a and 10b designate resistors, 10c and 10d transistors, 10e a Zener dwode, 10f an ignition coil, and an output terminal 10g of the secondary winding of the ignition coil 10f is connected to the spark plugs mounted on the engine cylinders through the distributor which is not shown.

Numeral 111 designates a battery, 112 a key switch having its output terminal B+ to the supply terminal B− of the ignition signal amplifier 10. Numerals 113 and 114 designate respectively positive and negative constant voltage sources having their positive and negative output terminals V+ and V− connected to the power supply terminals.

Figure 5:
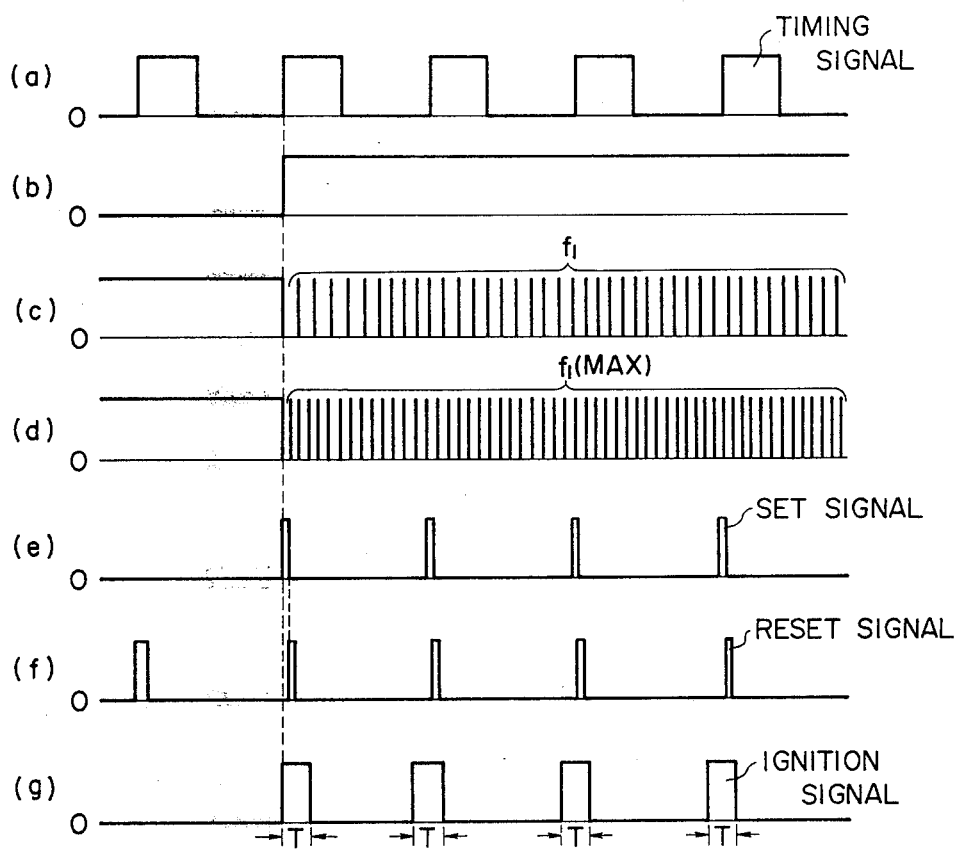
FIG. 5 is a waveform diagram useful for explaining the operation of the system shown in FIG. 2.

With the construction described above, the operation of the system of this invention will now be described. A timing signal produced in response to the closing and opening of the contact points 4a caused by the rotation of the distributor shaft, is amplified into a rectangular wave by the amplifier 51 as shown in (a) of FIG. 5 and the rectangular wave is applied as an engine speed signal to that one of the advance pattern voltage generators 1 which is responsive to engine speed. The combined output of this generator and those responsive to other engine parameters produces an advance control pattern voltage as shown in FIG. 4. This control voltage $V_C$ is then applied to the V-F converter 2 which in turn produces pulses of the frequency $f_1 = K(V_X - 2V_C)$. On the other hand, the amplifying controller 5 receives as its input the timing signal and produces a set signal and a reset signal as shown respectively in (e) and (f) of FIG. 5. The up-counter 3a counts up the pulses of the frequency $f_1$ shown in (c) of FIG. 5 in synchronism with the reset signal shown in (f) of FIG. 5 and the resulting count value $$C_P = f_1 \cdot \frac{30}{N}$$

is then read in the down-counter 6 in response to the set signal shown in (e) of FIG. 5, after which the thus stored count value is counted down by the down-counter 6 in response to the pulses of the fixed frequency $f_1(MAX)$ produced from the pulse oscillator 7 and shown in (d) of FIG. 5. When the count value of the down-counter 6 is reduced to zero, this time instant is selected as an ignition timing and the trigger circuit 8 produces a trigger signal, thus producing ignition sparks at the spark plugs through the monostable multivibrator 9, the ignition signal amplifier 10 and the distributor. This results in the advance angle $$\beta = \frac{V_C}{V_X} \cdot 180°$$

and consequently the ignition timing is controlled by the advance angle proportional to the advance control voltage $V_C$. Shown in (b) of FIG. 5 is the output signal of the erroneous operation preventive circuit 53 and also shown in (g) of FIG. 5 is the ignition signal produced from the monostable multivibrator 9 with symbol T indicating its predetermined monostable time.

While, in the embodiment described above, only an advance pattern voltage generator 1 relating to the parameter of engine speed has been described in detail, however, in the actual circuit, such pattern voltages as vacuum pattern voltage corresponding to the engine intake manifold vacuum, a water temperature pattern voltage corresponding to the engine cooling water temperature, etc., are superposed on the engine speed pattern voltage and the thus superposed output voltage is applied to the V-F converter 2. Further, while, the above-described embodiment includes the digital ignition timing computing circuit wherein the computation of ignition timing is accomplished by causing the up-counter 3 to count the output of the V-F converter 2, reading the count value thus counted by the up-counter 3 in the down-counter 6, causing the down-counter 6 to count down the pulses from the pulse oscillator 7 to decrease the read-in count value and then causing the trigger circuit 8 to produce an output when the output of the down-counter 6 is reduced to zero, it is possible to eliminate the counter 3 by, for example, arranging so that the up-down counters 61, 62 and 63 count up the output of the V-F converter 2 during the time that the contact points 4a are open and upon closing of the contact points 4a the up-down counters 61, 62 and 63 start counting down the pulses from the pulse oscillator 7 thus decreasing their count values and thereby causing the trigger circuit 8 to produce an output when the outputs of the up-down counters 61, 62 and 63 are reduced to zero. Still further, in the embodiment shown in FIG. 2, the required digital ignition timing computing circuit may be provided by using, in place of the down-counter 6 and the trigger circuit 8, a latch circuit for temporarily storing the count value of the counter 3, a counter adapted to be reset in response to the opening of the contact points 4a so as to repeatedly count the pulses from the pulse oscillator 7 and a digital comparator adapted for producing an output when the count value of the counter become equal to the stored value of the latch circuit and by selecting the time of production of an output from the digital comparator as the desired ignition timing. Still further, while, in the above-described embodiment, the timing signal generator 4 comprises the contact points 4a adapted to be closed and opened in response to the rotation of the distributor shaft, of course the timing signal generator 4 may comprise any of the known type of electromagnetic timing signal generating means and photoelectric timing signal generating means adapted for producing output signals in response to the rotation of the distributor shaft. Still further, while, in the above-described embodiment, the output signal of the timing signal generator 4 is also utilized as the engine speed detection signal for one of the advance pattern voltage generators 1 and as the rotational cycle signal for the counter 3, it is possible to accomplish the computation of ignition timing with greater accuracy by using the output signal of an electromagnetic pick-up adapted to produce an output in accordance with the rotation of the teeth of the engine ring gear, as the engine speed detection signal for the advance pattern voltage generator 1 responsive to engine speed and as the rotational cycle signal for the counter 3 and also by increasing the output frequency of the V-F converter 2 with respect to the input voltage and the output frequency of the pulse oscillator 7.

We claim:

1. An electric ignition advance system for internal combustion engines comprising:
   a plurality of parameter voltage generators for generating respectively parameter voltage signals indicative of operating parameters of an engine, said operating parameters including at least a rotational speed of the engine;
   a plurality of advance pattern voltage generators each connected to corresponding one of said plurality of parmeter voltage generators for generating an advance voltage signal varying in accordance with a corresponding one of said parameter voltage signals, each said advance voltage signal representing a predetermined ingition advance with respect to the corresponding operating parameter of said engine;
   a voltage-to-frequency converter, connected to said plurality of advance pattern voltage generators, for generating a frequency signal, the frequency thereof being varied in accordance with combined advance voltage signals;
   a timing signal generator for generating a timing signal at a predetermined rotational reference position of said engine;
   a first counter, connected to said voltage-to-frequency converter and said timing signal generator, for counting said frequency signal during one cycle period of said timing signal;
   an oscillator for generating an oscillation signal of a fixed frequency;
   a second counter, connected to said oscillator and said timing signal generator, for counting said oscillation signal in response to said timing signal;
   a trigger circuit, connected to said second counter, for generating a trigger signal at the time when a count value of said second counter becomes equal to the one of said first counter; and
   an ignition device, connected to said trigger circuit, for firing said engine in response to said trigger signal.

2. An electric ignition advance system as set forth in claim 1, wherein said first counter comprises an up-counter for counting up said frequency signal and said second counter comprises a down-counter for counting down the count value of said up-counter in response to said oscillation signal.

3. An electric ignition advance system as set forth in claim 1, further comprising:
   a preventive circuit, connected to said timing signal generator, for generating an output signal when the number of said timing signals is below a predetermined value; and
   first and second gates, connected between said converter and said first counter and between said oscillator and said second counter, respectively, for preventing said frequency signal and said oscillation signal from being applied to said first counter and said second counter in response to said output signal.

* * * * *